(12) United States Patent
Nakajima

(10) Patent No.: US 7,150,403 B2
(45) Date of Patent: Dec. 19, 2006

(54) SHUTTER MECHANISM USED FOR CARD MODULE

(75) Inventor: Daisuke Nakajima, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/951,542

(22) Filed: Sep. 14, 2001

(65) Prior Publication Data

US 2002/0125326 A1 Sep. 12, 2002

(30) Foreign Application Priority Data

Mar. 7, 2001 (JP) ............................ 2001-064012

(51) Int. Cl.
*G06K 7/00* (2006.01)
(52) U.S. Cl. ...................... 235/486; 235/479
(58) Field of Classification Search .............. 235/476, 235/441, 492, 379, 479, 485–487; 439/137–141; 361/600, 737; 360/2, 132, 133
See application file for complete search history.

(56) References Cited

U.S. PATENT DOCUMENTS

| | | | | |
|---|---|---|---|---|
| 4,724,310 A | * | 2/1988 | Shimamura et al. | 235/483 |
| 4,931,622 A | * | 6/1990 | Ohtsuki et al. | 235/487 |
| 5,010,239 A | * | 4/1991 | Mita | 235/441 |
| 5,012,078 A | * | 4/1991 | Pernet | 235/441 |
| 5,028,767 A | * | 7/1991 | Mizuno | 235/441 |
| 5,380,997 A | * | 1/1995 | Hania et al. | 235/485 |
| 5,760,380 A | * | 6/1998 | May | 235/379 |
| 5,801,614 A | * | 9/1998 | Kokubu | 340/425.5 |
| 5,812,400 A | * | 9/1998 | Eddy et al. | 705/410 |
| 5,815,468 A | * | 9/1998 | Muramatsu et al. | 369/2 |
| 5,902,992 A | * | 5/1999 | Igarashi | 235/492 |
| 6,129,572 A | * | 10/2000 | Feldman et al. | 439/328 |
| 6,176,423 B1 | * | 1/2001 | Egami | 235/379 |
| 6,260,651 B1 | * | 7/2001 | Kokubu et al. | 180/287 |
| 6,341,727 B1 | * | 1/2002 | Canard et al. | 235/486 |
| 6,409,546 B1 | * | 6/2002 | Ito et al. | 439/630 |
| 6,561,431 B1 | * | 5/2003 | Roussy et al. | 235/492 |
| 6,592,041 B1 | * | 7/2003 | Hanzawa | 235/486 |
| 6,633,483 B1 | * | 10/2003 | Akagi et al. | 361/686 |
| 6,690,574 B1 | * | 2/2004 | Kasahara et al. | 361/683 |
| 2001/0025881 A1 | * | 10/2001 | Shepherd | 235/379 |

FOREIGN PATENT DOCUMENTS

| | | | |
|---|---|---|---|
| JP | 01064086 A | * | 3/1989 |
| JP | 282204 | | 10/1995 |
| JP | 048869 | | 2/1999 |
| WO | WO 200034079 A1 | * | 6/2000 |

* cited by examiner

*Primary Examiner*—Ahshik Kim
*Assistant Examiner*—Kumiko C. Koyama
(74) *Attorney, Agent, or Firm*—Birch, Stewart, Kolasch & Birch, LLP

(57) ABSTRACT

A shutter mechanism used for card module opens and closes a card module slot of electronic device installed on a motor vehicle. The shutter mechanism has a shutter body and a card holding section. The shutter body is reciprocally movable between a closing position closing a slot and an evacuation position apart from the slot in a direction perpendicular to a direction of inserting the card into the slot and in a direction of a surface of the card inserted into the slot. The card holding section is arranged on the shutter body to press a rear end of the card, which is inserted into the slot when the shutter body stops at the closing position, in the insertion direction of the card.

12 Claims, 5 Drawing Sheets

SHUTTER MECHANISM USED FOR CARD MODULE

BACKGROUND OF THE INVENTION

1. Field of the Invention

The present invention relates to a shutter mechanism for use in a card module slot of electronic device on board of a motor vehicle, the electronic device being subject to vibration when the motor vehicle moves.

2. Description of the Prior Art

In recent years, a card module based on PCMCIA standards for example rapidly comes into widespread use in the electronic device such as a personal computer and so on. Very recently, such a trend is also seen in the electronic device installed on the motor vehicle, the equipment including an in-car navigation system and an in-car audio.

The card module is installed in a card module slot (hereafter, referred as a slot) for use in insertion/removal of the card module, which is arranged in the electronic device. A shutter mechanism which is disclosed in JP-A-1995/282204 is arranged in the slot. The shutter mechanism opens and closes a slot of the electronic device such as a personal computer and so on. The shutter mechanism closes the slot into which the card module is not inserted, and protects a connector and another parts in the slot from dust. However, the shutter mechanism is of limited application to the electronic device such as the personal computer, and is not designed on the assumption that would be applicable to the electronic device which is installed on the motor vehicle and which is vulnerable to vibration when the motor vehicle moves. Therefore, even if a conventional shutter mechanism is applied to the electronic device installed on the motor vehicle, it is not possible to obviate the inconvenience of removing a card connector due to the vibration of the vehicle or of causing a noise due to the vibration of the card.

The technique which is disclosed in JP-A-1999/48869 is known as the prior art of preventing the noise due to the vibration of the card. The official gazette discloses a card stock structure arranged at an instrument panel within the motor vehicle such as cars. The card stock structure stocks cards such as pay cards used in parking lots or gas stations and prepaid cards such as telephone cards so as to facilitate removing the cards. With the card stock structure, a resilient card holding section presses one face of the card accommodated in the card stock structure to prevent the occurrence of noise due to the vibration of the card.

However, if the card stock structure is applied to the slot of the electronic device installed on the motor vehicle above, there is the possibility that circuits of the card module is subject to damage because the card holding section presses and fixes the face of the card. Therefore, it is difficult to apply the card stock structure to the electronic device installed on the motor vehicle in effect.

SUMMARY OF THE INVENTION

Accordingly, it is an object of the present invention to provide a shutter mechanism used for a card module, even if the shutter mechanism is subject to vibration when the motor vehicle moves, prevents the pop-up of the card module, the occurrence of noise and the removal of the connector.

In order to achieve the object of the present invention, a shutter mechanism used for card module comprises a shutter body reciprocally movable between a closing position closing a card module slot and an evacuation position apart from the card module slot in a direction perpendicular to a direction of inserting the card module into the card module slot and in a direction of a surface of the card module inserted into the card module slot; and a card holding section arranged on the shutter body, pressing a rear end of the card module, which is inserted into the card module slot when the shutter body stops at the closing position, in the insertion direction of the card module. In this way, the card holding section can press the rear end of the card module accommodated in the card module slot. It can be therefore sure to prevent the pop-up of the card module and the occurrence of noise even if the shutter mechanism is subject to vibration when the motor vehicle moves.

The card holding section may be projected from the shutter body, and a tilting section may be arranged on the shutter body, the tilting section having projection in gradually increasing height from the closing position of the shutter body to the card holding section. In this way, even if the card module is inadequately inserted into the slot, the tilting section can facilitate correcting an insertion position of the card module with respect to the slot as the shutter body closes the slot.

It may further comprise a first switch, which comes into contact with the card module when the card holding section presses the card module to detect the presence or absence of the card module in the card module slot. It this way, a rear face of the card holding section, which is deformed due to press of the card holding section on the rear end of the card module, comes into contact with the first switch. As a result, it can detect whether the card module is accommodated in the slot or not.

It may further comprise a second switch, which comes into contact with a part of the card module only when the shutter body stops at the evacuation position to detect an opening state of the card module slot. In this way, 'a state of opening a shutter' can be easily detected due to only operation of returning the shutter body to the evacuation position.

The second switch may be connected to a third switch, which relates to the removal of the card module. In this way, an appropriate handling relating to the removal of the card module including turning off a main power can be performed as the state of opening the shutter is detected. The shutter mechanism can avoid the removal of the card and the connector when a card supply power remains, and can remove safely the card module without destroying data stored in the card module.

DESCRIPTION OF THE PREFERRED EMBODIMENT OF THE INVENTION

Embodiments of the present invention will be hereafter explained.

Embodiment 1

Figure 1A:
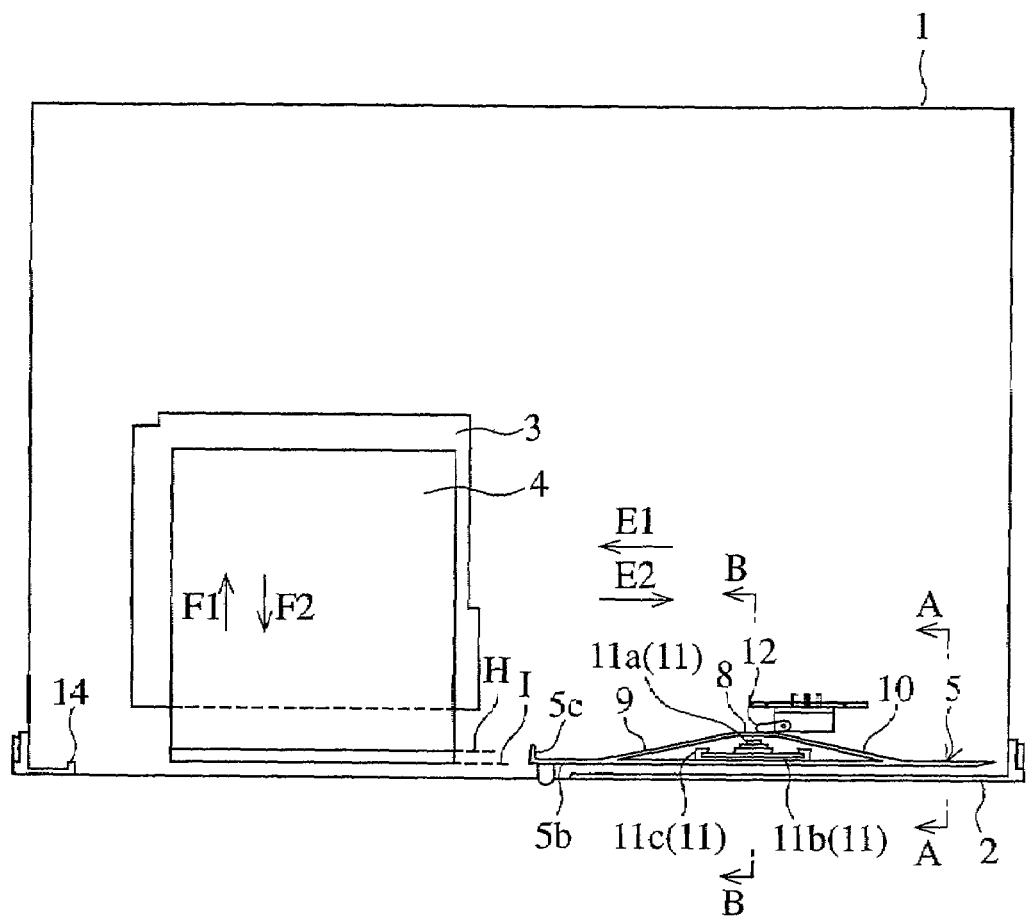
FIG. 1A is a plane view showing an opening state of a shutter mechanism used for a card module according to the present invention.
Figure 1B:
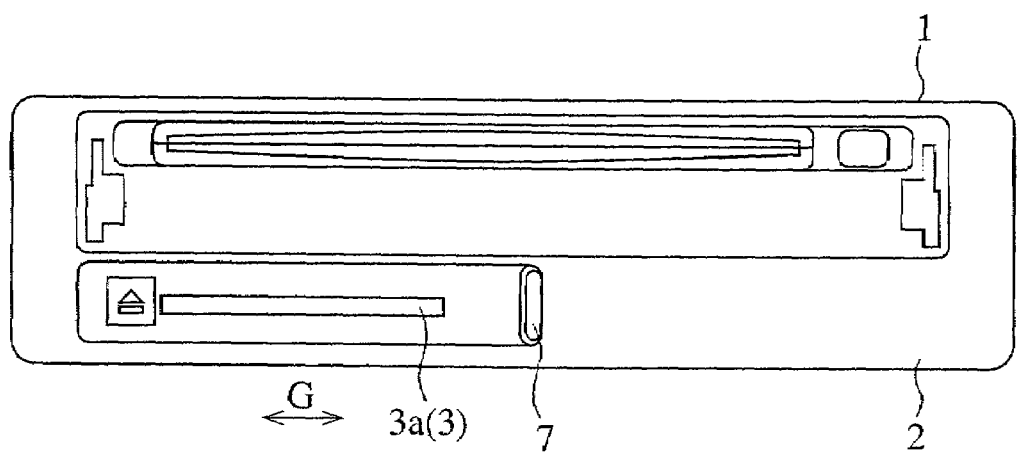
FIG. 1B is an external view showing a front panel of electronic device installed on a motor vehicle having the shutter mechanism of FIG. 1A.
Figure 2:
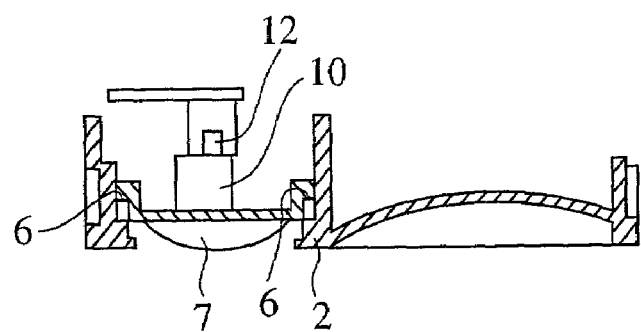
FIG. 2 is a cross sectional view taken along lines A—A of FIG. 1A, showing a construction of a shutter-open/close detection switching system for detecting opening and closing of the shutter mechanism.
Figure 3:
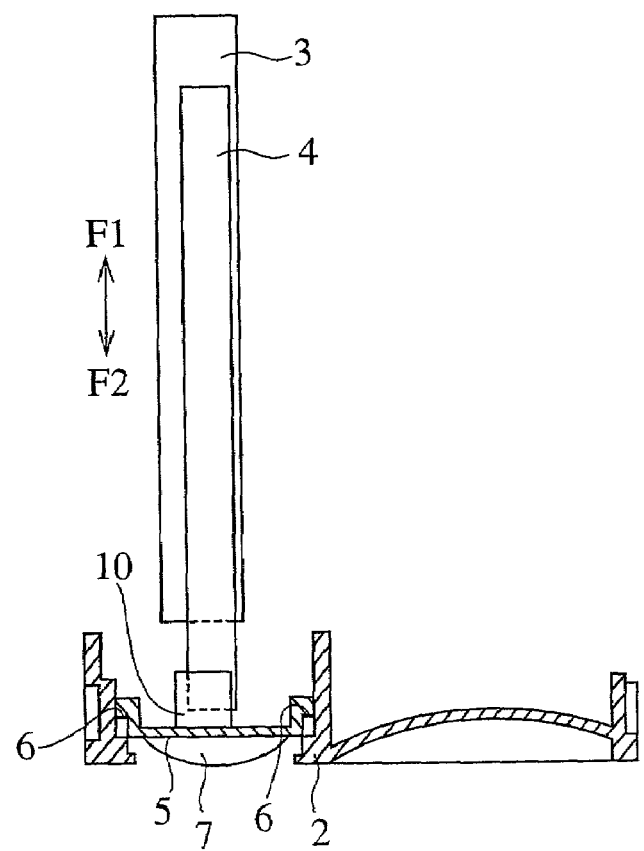
FIG. 3 is a cross sectional view taken along lines B—B of FIG. 1A, showing a positional relationship between a card holding section and a card module in FIG. 1A.
Figure 4:
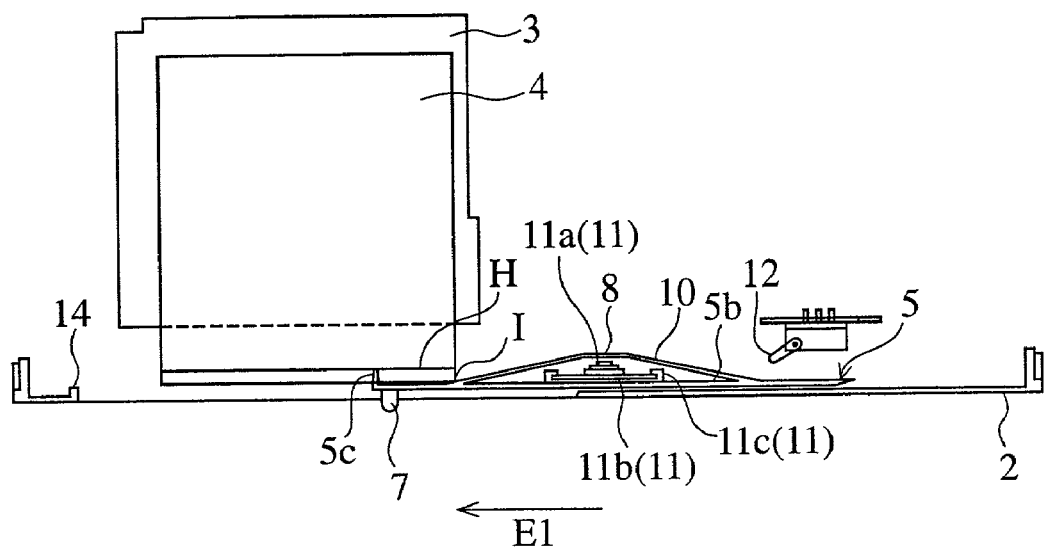
FIG. 4 is a plane view showing an intermediate state produced between the opening state and a closing state of the shutter mechanism used for a card module according to the present invention.
Figure 5:
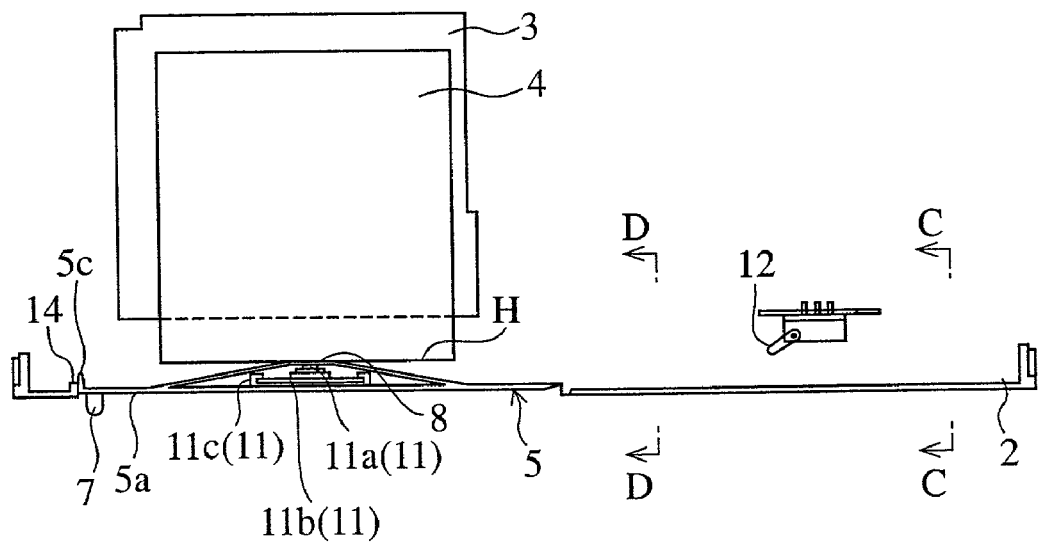
FIG. 5 is a plane view showing the closing state of the shutter mechanism used for a card module according to the present invention.
Figure 6:
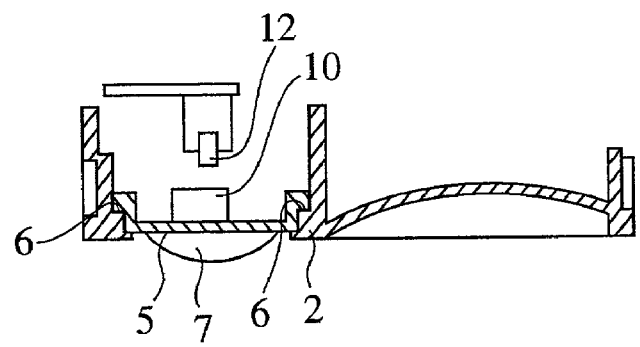
FIG. 6 is a cross sectional view taken along lines C—C of FIG. 5, showing a construction of a shutter-open/close detection switching system for detecting opening and closing of the shutter mechanism.
Figure 7:
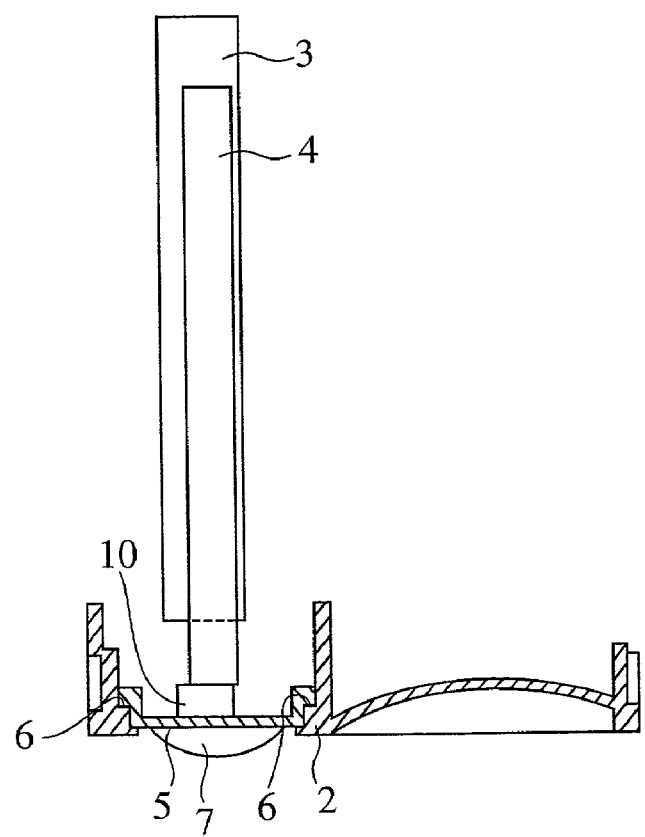
FIG. 7 is a cross sectional view taken along lines D—D of FIG. 5, showing a positional relationship between the card holding section and the card module in FIG. 5.
Figure 8:
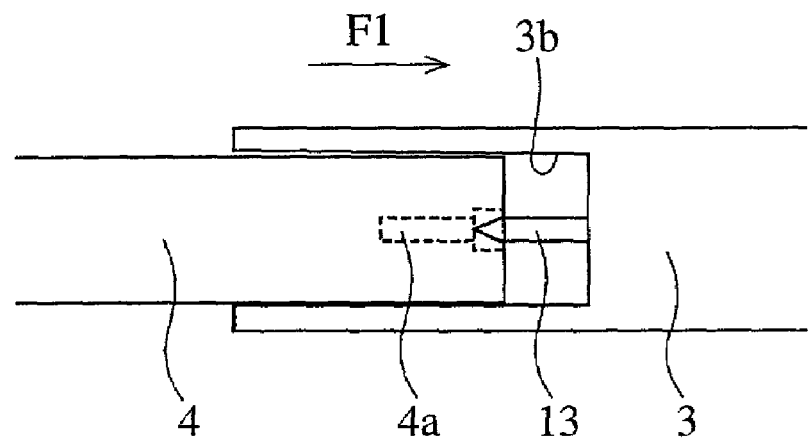
FIG. 8 is an enlarged cross sectional view showing a connection part when the card module is inadequately inserted into a slot.
Figure 9:
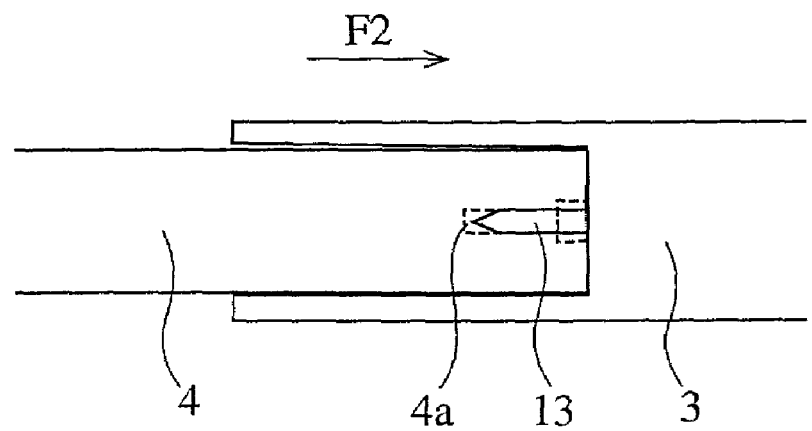
FIG. 9 is an enlarged cross sectional view showing the connection part when the card module is adequately inserted into the slot.

FIG. 1A is a plane view showing an opening state of a shutter mechanism used for a card module according to the present invention. FIG. 1B is an external view showing a front panel of electronic device installed on a motor vehicle having the shutter mechanism of FIG. 1A. FIG. 2 is a cross sectional view taken along lines A—A of FIG. 1A, showing a construction of a switch for detecting opening and closing of the shutter mechanism. FIG. 3 is a cross sectional view taken along lines B—B of FIG. 1A, showing a positional relationship between a card holding section and a card module in FIG. 1A. FIG. 4 is a plane view showing an intermediate state produced between the opening state and a closing state of the shutter mechanism used for a card module according to the present invention. FIG. 5 is a plane view showing the closing state of the shutter mechanism used for a card module according to the present invention. FIG. 6 is a cross sectional view taken along lines C—C of FIG. 5, showing a construction of a switch for detecting opening and closing of the shutter mechanism. FIG. 7 is a cross sectional view taken along lines D—D of FIG. 5, showing a positional relationship between the card holding section and the card module in FIG. 5. FIG. 8 is an enlarged cross sectional view showing a connection part when the card module is inadequately inserted into a slot. FIG. 9 is an enlarged cross sectional view showing the connection part when the card module is adequately inserted into the slot. The drawings above are common to embodiments 1 to 5, and are referenced in explanation of the respective embodiments. Components common to the respective embodiments are denoted by the same reference numerals and further description will be omitted.

In the drawings, reference numeral 1 denotes a housing of electronic device installed on a motor vehicle, and numeral 2 denotes a front panel of the housing 1. Numeral 3 denotes a slot accommodating a card module (hereafter, referred as a card) 4 such as a general PC card, a SRAM card and so on. The slot 3 has an opening 3a formed at a part of the front panel 2, and a card-accommodating chamber 3b including the opening 3a and extending in a direction perpendicular to a face of the front panel 2. The opening 3a of the slot 3 is slightly and inwardly retracted from the front panel 2. An inner space defined between the front panel 2 and the opening 3a is allocated as a space for disposing a shutter body (shutter mechanism) 5. The shutter body 5 is a plate member made from resins, which is reciprocally movable along a pair of guides 6 extending in both directions indicated by the arrows E1 and E2. Here, the both directions E1 and E2 are perpendicular to a card insertion direction (the arrow F1, see FIG. 1A) in which the card 4 is inserted into the slot 3. The both directions E1 and E2 also extend in a direction (the arrow G, see FIG. 1B) along a face of the card 4 inserted into the slot 4. A grasp section 7 is formed at a part of an outer face 5a of the shutter body 5. When the grasp section 7 moves toward the direction E1, the shutter body 5 is movable toward a closing position (see FIG. 5) where the shutter body 5 moves the most of travel in the direction E1 and closes the opening 3a of the slot 3. When the grasp section 7 moves toward the direction E2, the shutter body 5 is movable toward an evacuation position (see FIG. 1A) where the shutter body 5 moves the most of travel in the direction E2 and opens the slot 3.

A card holding section (shutter mechanism) 8 is integrally arranged at an inner face 5b of the shutter body 5 so as to project in the direction F1. The card holding section 8 of the embodiment 1 is formed as an apex section, which is defined by two tilting sections 9 and 10 as shown in FIG. 1A and so on. The tilting section 9 has projection in gradually increasing height from the closing position of the shutter body 5 to the card holding section as the apex. The tilting section 9 seems like a lower end section, which extends in the direction E1 from the viewpoint of the card holding section 8. The tilting section 10 has projection in gradually increasing height from the evacuation position of the shutter body 5 to the card holding section as the apex. The tilting section 9 seems like a lower end section, which extends in the direction E2 from the viewpoint of the card holding section 8. Since the resilient tilting sections 9 and 10 supports the card holding section 8 of the shutter body 5, the section 8 is resiliently deformed when the section 8 is subject to a force exerted in the direction F2 of the removal of the card 4 (see FIG. 5). When the force is removed from the section 8 (see FIG. 1A and FIG. 4), the section 8 returns to its original shape.

A card-detection switching system (first switch) 11 detecting the presence or absence of the card 4 in the slot 3, is arranged at a position, where the deformed section 8 comes into contact with the card-detection switching system 11, of the inner face 5b of the shutter body 5.

A shutter-open/close detection switching system (second switch) 12 detecting an open/close state of the shutter mechanism, is arranged at a position, where the system 12 comes into contact with the tilting section 10 of the shutter body 5 stopped at the evacuation position, of the housing 1.

A conduction pin 13 of the electronic device, which connects with a contact 4a of the card 4 when the card 4 is inserted into the slot 4, is arranged in the most recesses of the card-accommodating chamber 3b of the slot 3.

A contact section 14, which comes into contact with a contact portion 5c arranged at an end of the shutter body 5 close to the closing position, is arranged at a rear face of the front panel 2 of the housing 1. The contact section 14 functions as a positioning section to bring the shutter body 5 to a precise stop at the closing position, and accordingly the section 8 presses a center of a rear end 4b of the card 4 inserted into the slot 3 in the direction F1.

An operation of the shutter mechanism will be hereafter explained.

First, the card 4 is inserted into the opening 3a of the slot 3 when the shutter body 5 stops at the evacuation position as shown in FIG. 1A. At this time, the rear end 4b of the card 4 must achieve a correct position H shown in FIG. 1A. In this way, the card 4 is correctly inserted into the card-accommodating chamber 3b to connect the contact 4a of the card 4 with the conduct pin 13 of the card-accommodating chamber 3b. Next, when the grasp section 7 is pulled in the direction E1 as shown in FIG. 4, the shutter body 5 starts moving toward the front of the opening 3a of the slot 3. The shutter body 5 then stops at a position (closing position) where the contact portion 5c of the shutter body 5 comes into contact with the contact section 14 of the front panel 2 as shown in FIG. 5. At this time, the resilient card holding section 8 arranged at the shutter body 5 presses softly the center of the rear end 4b of the card 4, which is inserted into the slot 3, in the direction F1 at all times. In this way, since the shutter mechanism prevents the card 4 from removing in the direction F2 opposite to the direction F1, the connection between the contact 4a of the card 4 and the conduct pin 13 of the card accommodating chamber 3b are reliably kept.

As described above, according to the embodiment 1, the card holding section 8 arranged at the shutter body 5 presses the rear end 4b of the card 4 accommodated in the card accommodating chamber 3b of the slot 3 at all times. In this way, it can be sure to prevent the pop-up of the card 4 and the occurrence of noise even if the shutter mechanism is subject to vibration when the motor vehicle moves.

Since the card holding section 8 is resilient, the card 4 is not strongly pressed in the direction F1. The card holding section 8 can absorb vibration when the motor vehicle moves, and can reduce effects of vibration on the card 4.

Since the card holding section 8 presses the rear end 4b of the card 4, the card 4 can be normally held in the card accommodating chamber 3b without deforming the card 4. This point is different from the prior art that there is the possibility of damaging that circuits of the card 4 because the card holding section presses the face of the card.

Embodiment 2

The embodiment 2 is characterized in that a card-detection switching system (first switch) 11, which detects whether the card 4 is accommodated in the slot 3 or not, is disposed. In other words, the card-detecting switching system 11 includes a switching section 11a, a switching board 11b mounting the switching section 11a, and a board-sliding/holding section 11c holding the switching board 11b on the inner face 5b of the shutter body 5. The card-detection switching system 11 is constructed that a rear face of the card-holding section 8, which is deformed due to press against the rear end 4b of the card 4, comes into contact with the card-detection switching system 11. The card-detection switching system 11 may respond to contact with the card-holding section 8 to indicate a mark (not shown) of 'the presence of the card' on the front panel 2, for example.

As described above, according to the embodiment 2, the rear face of the card-holding section 8, which is deformed due to press against the rear end 4b of the card 4, comes into contact with the card-detection switching system 11. In this way, it can detect whether the card 4 is accommodated in the slot 3 or not.

With the embodiment 2, the switching board 11b can slide from above the housing 1 to fit in the board-sliding/holding section 11c. The switching board 11b mounting the switching section 11a simply drops from above the housing 1 to facilitate inserting the switching board 11b into the board-sliding/holding section 11c even if a space between the shutter body 5 and the card-holding section 8 is narrow.

With the embodiment 2, the board-sliding/holding section 11c of the card-detection switching system 11 and the card-holding section 8 above are integrally arranged at the shutter body 5. The shutter mechanism facilitates assembly of the shutter mechanism, and allows the design at a low cost.

Embodiment 3

The embodiment 3 is characterized in that the tilting section 9 is disposed to obviate a semi-inserted state in which the card 4 is inadequately inserted into the slot 3. In other words, with the semi-inserted state that the card 4 is inadequately inserted into the slot 3, the rear end 4b of the cards locates at the incorrect position I as shown in FIG. 1A, and the card 4 is not correctly inserted into the card-accommodating chamber 3b. Since the contact 4a is not connected with the conduct pin 13, the electronic device communicates with the card 4 under a defective condition. As the shutter body 5 moves in the direction F1, the rear end 4b of the card 4 comes into contact with the end of shutter body 5 close to the closing position, the tilting section 9 and the card-holding section 8 in the order. It can therefore induce moving the card 4 in the direction F1 to press the card 4 toward the correct position H as shown in FIG. 1A to prevent the removal of the connector. In this way, the card 4 can be accommodated in the card-accommodating chamber 3b to connect reliably the contact 4a of the card 4 with the conduct pin 13.

As described above, according to the embodiment 3, as the shutter body 5 closes the slot 3, the tilting section 9 facilitates to adjust a position of the card 4 even if the card 4 is inadequately inserted into the slot.

The tilting section 9 can also press easily the card 4 in the slot 3 to prevent the removal of the connector.

Embodiment 4

The embodiment 4 is characterized in that the shutter-open/close detection switching system (second switch) 12 is arranged at a position where the system 12 comes into contact with the tilting section 10 of the shutter body 5 stopped at the evacuation position, of the housing 1. In other words, 'a state of opening a shutter' can be easily detected due to the shutter-open/close detection switching system 12 as the shutter body 5 returns to the evacuation position.

As described above, according to the embodiment 4, the shutter-open/close detection switching system 12 allowing contact with the tilting section 10 is disposed. In this way, 'a state of opening a shutter' can be easily detected due to only operation of returning the shutter body 5 to the evacuation position.

Embodiment 5

The embodiment 5 is characterized in that the shutter-open/close detection switching system 12 is connected with a switch (not shown, third switch) of the card supply power (not shown) as an appropriate handling relating to the removal of the card 4. With the construction, for example, the switch (third switch) of the card supply power (not shown) can be turned off in synchronization with the resultant detection of 'a state of opening a shutter' due to the shutter-open/close detection switching system 12.

As described above, according to the embodiment 5, since the shutter-open/close detection switching system 12 is connected with the third switch, the card supply power can be turned off when the 'state of opening the shutter' is detected. In this way, the shutter mechanism can avoid the removal of the card when the card supply power remains, and can remove safely the card 4 without destroying data stored in the card 4.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A shutter mechanism used for a card module, opening and closing a card module slot of an electronic device installed on a motor vehicle, comprising:
   a shutter body reciprocally movable in a lateral direction between a closing position closing a card module slot and an evacuation position apart from the card module slot and on the same plane as the card module slot, in a direction perpendicular to a direction of inserting the card module into the card module slot and in a direction of a surface of the card module inserted into the card module slot; and
   a card holding section, arranged on the shutter body and gradually extending in height from two sides of the shutter body, being resiliently deformable and continuously pressing a rear face of the card module in the insertion direction of the card module, the rear face being substantially perpendicular to the insertion direction of the card module, the card module being inserted into the card module slot when the shutter body stops at the closing position.

2. A shutter mechanism used for card module according to claim 1, further comprising a first switch, arranged at a position where the card holding section deforms and comes into contact with the position, for detecting whether the card module is installed in the card module slot.

3. The shutter mechanism used for card module according to claim 1, further comprising a contact portion, arranged at an end of a housing, for bringing the shutter body to precisely stop at the closing position.

4. A shutter mechanism used for card module, opening and closing a card module slot of electronic device installed on a motor vehicle, comprising:
   a shutter body reciprocally movable between a closing position closing a card module slot and an evacuation position apart from the card module slot in a direction perpendicular to a direction of inserting the card module into the card module slot and in a direction of a surface of the card module inserted into the card module slot; and
   a card holding section arranged on the shutter body, continuously pressing a rear end of the card module which is inserted into the card module slot when the shutter body stops at the closing position, in the insertion direction of the card module;
   wherein the card holding section is projected from the shutter body, and
   wherein a tilting section that is resiliently deformable is integrally arranged on the shutter body, the height thereof being gradually increasing from the closing position of the shutter body to the card holding section.

5. A shutter mechanism used for card module according to claim 4, further comprising a second switch, arranged at a position where the shutter body comes into contact with the tilting section, for detecting whether the card module slot is opened or not.

6. A shutter mechanism used for card module according to claim 5, further comprising a third switch connected to the second switch, which performs a process related to a removal of the card module.

7. A shutter device for a card reader module, comprising:
   a shutter body movable between an open position opening a slot of a card module and a closed position; and
   wherein said shutter body including a portion that is resiliently deformable and gradually projects in height from two sides of the shutter body for holding an inserted card, upon moving from the open position to the closed position, within the card module using contact of a rear face of the card with said portion in an insertion direction of the card, the rear face being substantially perpendicular to the insertion direction.

8. The shutter device of claim 7 wherein said shutter body portion contacts and fully inserts a partially inserted card into the card module upon moving from the open position to the closed position.

9. The shutter device of claim 7 wherein said shutter body including a switch to detect the inserted card upon contact of said shutter body portion with the switch.

10. The shutter device of claim 7, further comprising:
    a switch to detect said shutter body moving from the closed position to the open position upon contact of said shutter body with the switch.

11. The shutter device of claim 10, wherein said switch to deactivate a power supply of the card module in response to detecting said shutter body moving from the closed position to the open position.

12. A transportation vehicle, comprising:
    a card module including a slot; and
    wherein said card module including a shutter body movable between an open position opening the slot of the card module and a closed position in a lateral direction and on the same plane as the slot; and
    wherein said shutter body including a portion that gradually extends in height from two sides of the shutter body and is resiliently deformable for holding an inserted card, upon moving from the open position to the closed position, within the card module using contact of a rear face of the card with said portion in an insertion direction of the card, the rear face being substantially perpendicular to the insertion direction.

* * * * *